(12) United States Patent
Ohman, Jr.

(10) Patent No.: US 8,205,922 B1
(45) Date of Patent: Jun. 26, 2012

(54) GROMMET SHACKLE

(75) Inventor: Roger Arthur Ohman, Jr., Parrish, FL (US)

(73) Assignee: The Crosby Group LLC, Tulsa, OK (US)

( * ) Notice: Subject to any disclaimer, the term of this patent is extended or adjusted under 35 U.S.C. 154(b) by 10 days.

(21) Appl. No.: 13/081,977

(22) Filed: Apr. 7, 2011

(51) Int. Cl.
*B66C 1/34* (2006.01)

(52) U.S. Cl. ................... 294/82.11; 294/82.1

(58) Field of Classification Search .............. 294/82.1, 294/82.11, 82.17, 82.21, 82.19; 24/599.1, 24/599.2, 116 R, 601.5
See application file for complete search history.

(56) References Cited

U.S. PATENT DOCUMENTS

| | | | |
|---|---|---|---|
| 199,073 A | | 1/1878 | Kinney |
| 265,720 A | * | 10/1882 | Trott et al. ............... 294/82.1 |
| 2,036,135 A | * | 3/1936 | Greenup .............. 294/82.19 |
| 2,043,460 A | * | 6/1936 | Young ................. 294/82.1 |
| 2,420,256 A | | 10/1944 | MacKenzie |
| 2,417,741 A | | 3/1947 | Dillion |
| 2,449,795 A | | 9/1948 | Stillwagon |
| 2,709,616 A | * | 5/1955 | Larson et al. ........... 294/82.1 |
| 2,711,607 A | * | 6/1955 | Watson ................ 294/82.1 |
| 3,609,826 A | | 10/1971 | Seabourn |
| 3,787,134 A | | 1/1974 | Burr |
| 3,966,240 A | | 6/1976 | Enomoto |
| 4,079,584 A | | 3/1978 | Shahan |
| 4,113,397 A | | 9/1978 | Snyder |
| 4,221,252 A | | 9/1980 | Bruce |
| 4,337,614 A | | 7/1982 | Briscoe |
| 4,639,979 A | | 2/1987 | Polson |
| 5,046,881 A | | 9/1991 | Swager |
| 5,391,133 A | | 2/1995 | Ruffa |
| 5,597,260 A | | 1/1997 | Peterson |
| 6,019,407 A | | 2/2000 | Ohman et al. |
| 6,023,927 A | | 2/2000 | Epstein |
| 6,464,268 B1 | | 10/2002 | Hough et al. |
| 6,533,333 B1 | | 3/2003 | Radzik |
| 6,953,212 B2 | | 10/2005 | Alba |
| 7,000,905 B1 | | 2/2006 | Lutter et al. |
| 7,293,763 B2 | | 11/2007 | Lutter et al. |
| 7,384,078 B2 | | 6/2008 | Cobb et al. |
| 7,654,594 B2 | * | 2/2010 | Bisso, IV ................. 294/82.35 |

FOREIGN PATENT DOCUMENTS

| | | |
|---|---|---|
| GB | 196860 | 5/1923 |
| GB | 1496357 | 12/1977 |

OTHER PUBLICATIONS

Sea-Fit, Inc.,Super Shackle: Superior Design Features, "A True Protector of Slings",(p. 4 of 5), www.Sea-Fit.com, Jefferson, Louisiana, United States, 2010.
"Guidance on the Use of Cable Laid Sling and Grommets", International Marine Contractors Association,; www.imcaint.com; IMCS M 179, (pp. 2-5), London, United Kingdom, Aug. 2005.
Wire Rope Sling Users Manual, Second Edition, Wire Rope Technical Board, Alexandria, Virginia, United States, Jan. 1990.

* cited by examiner

*Primary Examiner* — Paul T Chin
(74) *Attorney, Agent, or Firm* — Head, Johnson & Kachigian P.C.

(57) ABSTRACT

A grommet shackle having a pair of opposed parallel legs. Each of the legs includes an opening therethrough to receive a pin or bolt. A central bow extends between the pair of legs to form a jaw to receive a rope or cable. The central bow has a cylindrical cross-section including an inner cylindrical load surface toward the eye to receive the rope or cable thereon. An outer cylindrical surface of the central bow forms a hollow recess. A central brace or rib extends across the hollow recess.

9 Claims, 3 Drawing Sheets

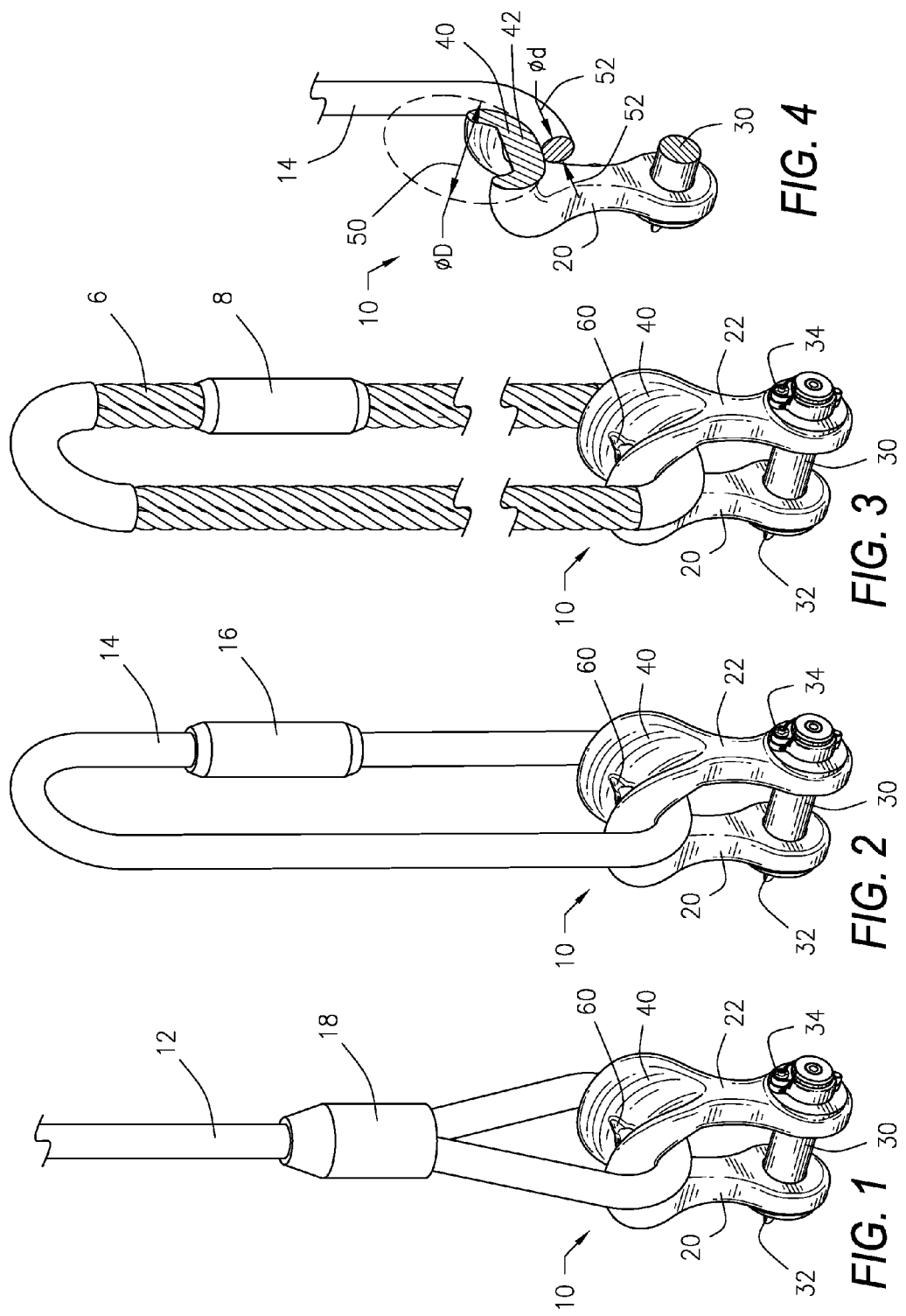

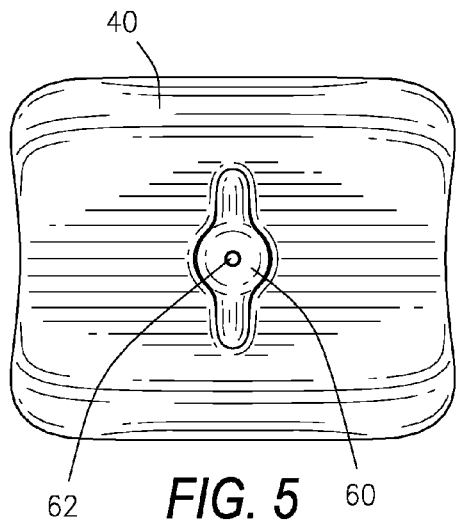
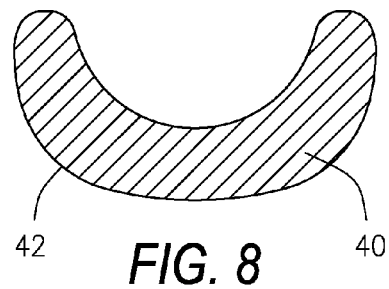
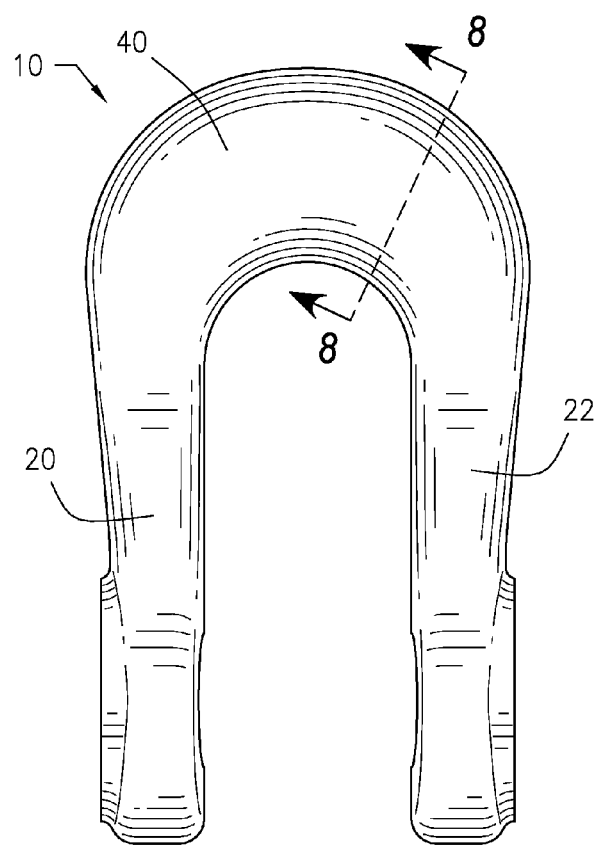
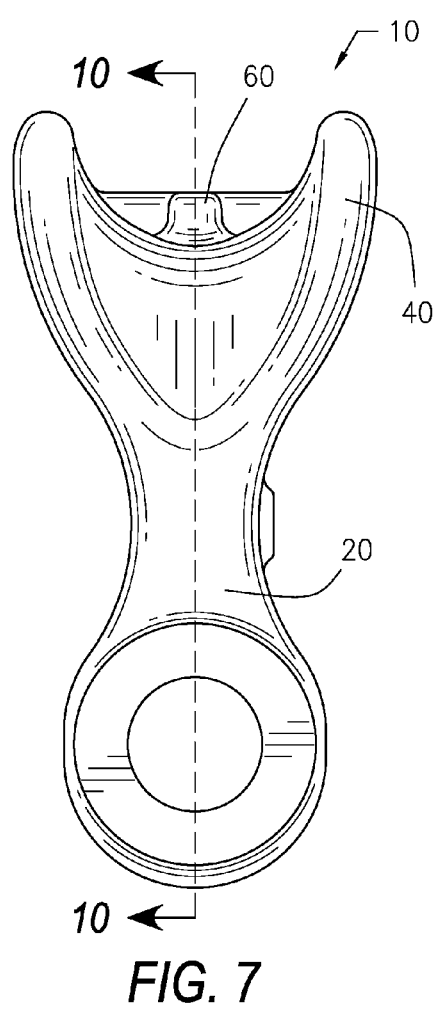
FIG. 5
FIG. 8
FIG. 6
FIG. 7

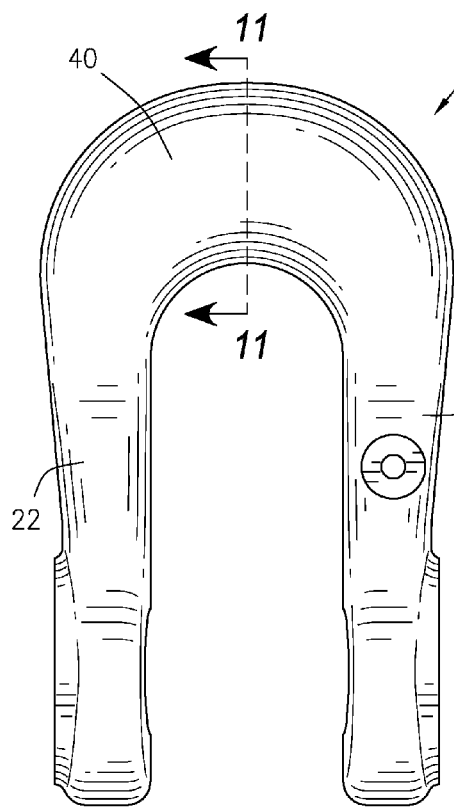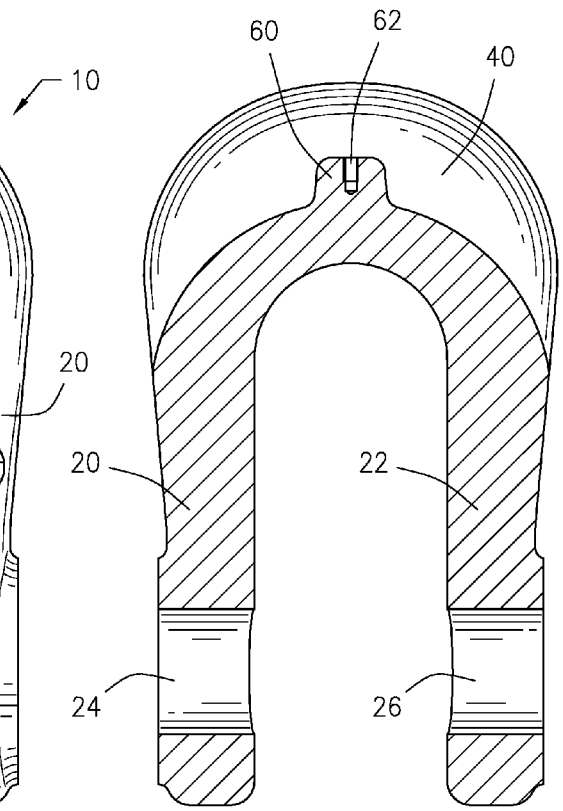
FIG. 9    FIG. 10
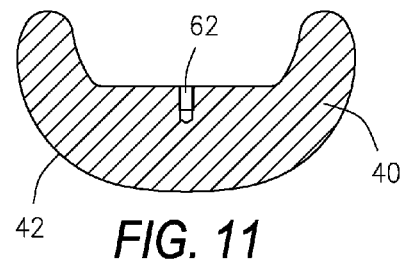
FIG. 11

GROMMET SHACKLE

BACKGROUND OF THE INVENTION

1. Field of the Invention

The present invention relates to a grommet shackle for heavy duty fittings for lifting applications which are often subjected to forces of several hundred tons or more. In particular, the present invention is directed to a grommet shackle for heavy duty lifting applications which will, maximize the efficiency of the cable or rope attached thereto while minimizing the weight of the shackle itself.

2. Prior Art

Various designs for lifting shackles have been employed in the past. One example of an existing shackle is shown in Assignee's U.S. Pat. No. 4,079,584 issued Mar. 21, 1978 titled Heavy Duty Shackle.

In a typical shackle design, a pair of parallel ears or legs extend from a U-shaped bow. The ears or legs each contain an opening therethrough. The openings are aligned to receive a clevis pin or bolt. In large shackles for heavy duty applications, such as for use with marine anchors, the shackles may be rated for use at one hundred or even one hundred and twenty-five tons of force. These shackles themselves typically weigh over one hundred pounds and will often be moved with lifting equipment.

It would, therefore, be advantageous to minimize the weight of the shackle while maximizing the load capacity of the shackle.

Heavy duty shackles are employed with a variety of lifting equipment and fittings. Examples of fittings include a closed or endless loop wire rope sling with a swage sleeve and a wire rope sling with a standard eye terminator. Various types of wire rope configurations are utilized. In one known configuration, a central unit rope is surrounded by a plurality of helically wound outer ropes to form a wire rope or cable grommet. In another known configuration, groups of wire rope strands are themselves braided together to form a braided grommet. When a wire rope, such as used in a sling, is used with a shackle, the wire rope extends through the jaw of the shackle and engages the inner surface of the bow of the shackle.

When a wire rope or cable is bent over a shackle bow, hook or other lift point, the working load limit of the wire rope is reduced by a bending factor. The bending factor ($E_B$) can be calculated according to the formula:

$$E_B \equiv 1 - \frac{0.5}{\sqrt{D/d}}$$

The diameter D represents the diameter of the bow around which the wire rope or cable is bent. The diameter d represents either diameter of the entire wire rope or cable grommet or, alternatively, represents the diameter of the individual wire strands. The D/d ratio is the ratio of the diameter around which the sling is bent divided by the diameter of the wire rope or cable.

It will be appreciated that the wire rope, thus, has an efficiency related to various D/d ratios.

Accordingly, it is a principal object and purpose of the present invention to provide a heavy duty shackle which will maximize the lifting capacity while minimizing the weight of the shackle itself.

It is a further object and purpose of the present invention to provide a heavy duty shackle with increased load bearing surface.

It is a further object and purpose of the present invention to maximize the efficiency of the lifting equipment including any cable or rope by maximizing the diameter of the bow of the shackle.

SUMMARY OF THE INVENTION

The present invention is directed to a grommet shackle for use with a wire rope sling, cable grommet or braided grommet.

The grommet shackle includes a pair of opposed parallel legs with each leg having an opening therethrough. The openings are aligned with each other in order to receive a pin or bolt.

A central bow extends between the pair of legs in order to form a jaw to receive the wire rope, cable grommet; or braided grommet. The central bow has a circumferential inner cylindrical load surface toward the jaw in order to receive and support the wire rope or cable thereon. The central bow also includes an outer cylindrical surface opposed to the circumferential inner load surface in order to form a hollow recess. The wire rope or cable bends around and mates with the inner cylindrical load surface of the central bow. A central brace or rib extends across the hollow recess of the central bow.

The central bow of the grommet shackle may include, an attachment connector in order to attach the shackle for movement and transportation of the shackle itself.

The design of the present invention permits an arrangement with a diameter D of the cylindrical load surface of the central bow has a ratio with a diameter d of the wire rope or cable such that the ratio D/d is four (4) or greater.

BRIEF DESCRIPTION OF THE DRAWINGS

FIG. 1 illustrates a perspective view of a grommet shackle constructed in accordance with the present invention in use with a wire rope sling;

FIG. 2 illustrates a perspective view of the grommet shackle shown in FIG. 1 in use with a wire rope or cable grommet;

FIG. 3 illustrates a perspective view of the grommet shackle shown in FIG. 1 in use with a braided grommet;

FIG. 4 illustrates a perspective view of the grommet shackle shown in FIG. 1 cut away with the wire rope grommet also cut away;

FIG. 5 illustrates atop view, FIG. 6 illustrates a front view, and FIG. 7 illustrates a side view of the grommet shackle shown in FIG. 1

FIG. 8 illustrates a sectional view taken along section line 8-8 of FIG. 6;

FIG. 9 illustrates a rear view of the grommet shackle shown in FIG. 1 with a bolt or pin removed;

FIG. 10 illustrates a sectional, view taken along section line 10-10 of FIG. 7; and FIG. 11 illustrates a sectional view taken along section line 11-11 of FIG. 9.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Referring to the drawings in detail, FIG. 1 illustrates a perspective view of a grommet shackle 10 constructed in accordance with, the present invention in use with and suspended from a wire rope sling 12 having a swage sleeve 18. FIG. 2 illustrates a perspective view of the grommet shackle 10 in use with and suspended from a wire rope or cable grommet 14 having a sleeve connector 16. FIG. 3 illustrates a perspective view of the grommet shackle 10 in use with and suspended from a braided grommet 6 with a sleeve connector 8. The wire rope sling 12, the wire rope or cable grommet 14 are used in various types of known lifting applications (not shown).

FIG. 4 illustrates a perspective view of the grommet shackle 10 shown in FIG. 1 cut away with the cable grommet 14 also cut away to illustrate the interface between the grommet shackle 10 and the cable grommet 14.

FIG. 5 illustrates a top view, FIG. 6 illustrates a front view and FIG. 7 illustrates a side view of the grommet shackle 10 with the pin or bolt removed therefrom for ease of viewing.

The grommet shackle 10 includes a pair of opposed parallel legs 20 and 22. Each of the legs 20 and 22 has an opening 24 and 26, respectively, therethrough. The openings 24 and 26 are aligned with each other in order to receive a pin or bolt 30.

A variety of pins or bolts may be employed within the spirit and scope of the present invention. For example, the bolt 30 may have a head 32 on one end larger than the diameter of the openings 24 and 26. The other end of the bolt 30 may be secured by a threaded nut or alternatively by a clamp mechanism 34.

One non-limiting example of a clamp mechanism is shown in Assignee's pending patent application Ser. No. 12/890,967 titled "Securing Mechanism for Shackle" which is incorporated herein by reference.

A central bow 40 extends between the pair of legs 20 and 22 in order to form a jaw or eye to receive, the wire rope sling 12, cable grommet 14 or braided grommet 6.

FIG. 8 illustrates a sectional view taken along section line 8-8 of FIG. 6. With reference to FIG. 4 and FIG. 8, the central bow 40 has a substantially cylindrical cross section.

FIG. 9 illustrates a rear view of the grommet shackle 10 with the bolt or pin 30 removed, FIG. 10 illustrates a sectional view of the grommet shackle taken along section line 10-10 of FIG. 7, and FIG. 11 illustrates a sectional view taken along section line 11-11 of FIG. 9.

Referring to FIGS. 4, 8 and 11, the central bow 40 has a circumferential inner cylindrical load surface 42 toward the jaw in order to receive and support the wire rope sling 12, cable grommet 14, or braided grommet 6 thereon. The central bow 40 also includes an outer cylindrical surface opposed to the circumferential inner cylindrical load surface 42 in order to form a hollow recess.

As readily seen in FIG. 4, the circumferential inner cylindrical load surface 42 has a diameter D illustrated by arrow 50. Likewise, the cable grommet 14 has a diameter d of the individual ropes represented by arrows 52. The cable grommet 14 bends around and mates with the cylindrical load surface 42 of the central bow 40.

As best seen in FIGS. 1, 2, 4, 7 and 10, a central brace or rib 60 extends across the hollow recess of the central bow 40. The central brace or rib 60 provides strength to the central bow 40 across the hollow recess without the weight of material filling the hollow recess.

The central bow 40 of the grommet shackle 10 may include an attachment connector in order to attach the shackle 10 in order to lift or transport the shackle itself. In one preferred embodiment, the central brace or rib 60 includes a threaded recess 62 as best seen in FIGS. 5, 10 and 11. The threaded recess 62 may receive a threaded post (not shown) attached to a lifting device in order to lift and transport the grommet shackle 10 itself.

The design of the present invention permits an arrangement where the diameter D of the cylindrical load surface 42 of the central bow 40 has a ratio with the diameter d of the wire rope or cable such that the ratio D/d is four (4) or greater. Accordingly, any reduction of the working load limit of the wire rope or cable based on the bending factor ($E_b$) is minimized.

It has now been found that the usage of the present invention will enable the cable grommet 14 to achieve up to seventy-five percent (75%) efficiency. It has been found that usage of the present invention will enable the braided grommet 6 to achieve up to ninety percent (90%) efficiency.

Whereas, the present invention has been described in relation to the drawings attached hereto, it should be understood that other and further modifications, apart from those shown or suggested herein, may be made within the spirit and scope of this invention.

What is claimed is:

1. A grommet shackle for use with a rope or cable which comprises:
   a pair of opposed parallel legs, each of said legs having an opening therethrough to receive a pin;
   a central bow extending between said pair of legs to form a jaw to receive said rope or cable;
   wherein said central bow has a cylindrical cross-section including an inner cylindrical load surface toward said jaw to receive said rope or cable thereon and an outer cylindrical surface forming a hollow recess; and
   a central brace or rib extending across said hollow recess.

2. A grommet shackle as set forth in claim 1 wherein said pin includes a head on one end of said pin and includes a nut to secure an opposed end of said pin in said shackle.

3. A grommet shackle as set forth in claim 1 wherein said rope or cable has a diameter d and wherein said cylindrical load surface of said central bow has a diameter D wherein the ratio D/d is four (4) or greater.

4. A grommet shackle as set forth in claim 1 wherein said central brace or rib spans said outer cylindrical surface of said central bow and is recessed within said hollow recess.

5. A grommet shackle as set forth in claim 1 including an attachment connector.

6. A grommet shackle as set forth in claim 5 wherein said attachment connector is recessed within said hollow recess of said central brace or rib.

7. A grommet shackle as set forth in claim 1 wherein said rope or cable is a cable grommet and achieves up to seventy-five percent (75%) efficiency.

8. A grommet shackle as set forth in claim 7 wherein said cable grommet includes a core rope with multiple outer ropes woven around said core rope.

9. A grommet shackle as set forth in claim 1 wherein said rope or cable is a braided grommet and achieves up to ninety percent (90%) efficiency.

* * * * *